Figure 1:
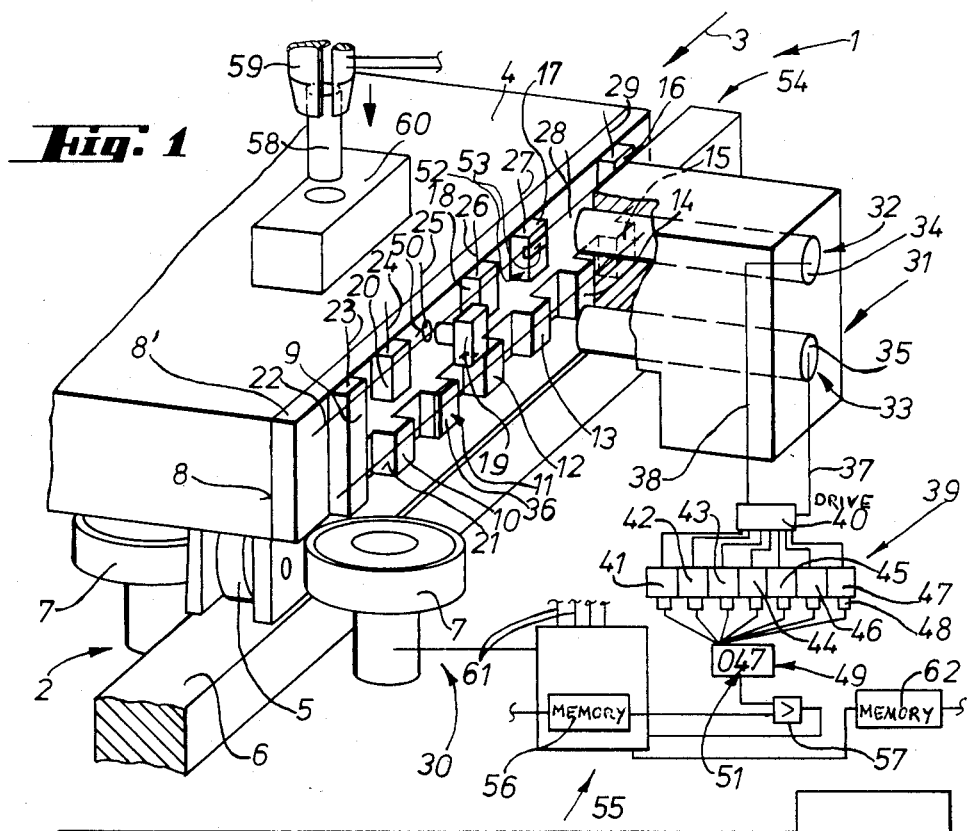

United States Patent [19]

Sticht

[11] Patent Number: 4,591,991
[45] Date of Patent: May 27, 1986

[54] CODING METHOD AND SYSTEM FOR ASSEMBLY LINE PALLETS

[75] Inventor: Walter Sticht, Attnang-Puchheim, Austria

[73] Assignee: STIWA-Fertigungstechnik Sticht GesmbH, Attnang-Puchheim, Austria

[21] Appl. No.: 597,641

[22] Filed: Apr. 6, 1984

[30] Foreign Application Priority Data

Apr. 21, 1983 [AT] Austria .................................. 1435/83
Feb. 6, 1984 [AT] Austria ................................... 361/84

[51] Int. Cl.⁴ ............................................. G06F 15/46
[52] U.S. Cl. .................................... 364/478; 29/33 P; 29/563; 235/375; 364/468
[58] Field of Search ............... 364/468, 469, 474, 478; 29/428-431, 33 P, 568, 563, 564-564.2, 705-771, 783-792; 414/134-136; 198/340, 341, 339, 356; 235/375, 383, 385, 435, 439, 440, 447, 456, 460, 487, 494

[56] References Cited

U.S. PATENT DOCUMENTS

| | | | |
|---|---|---|---|
| 4,237,598 | 12/1980 | Williamson | 364/478 X |
| 4,309,600 | 1/1982 | Perry et al. | 364/468 X |
| 4,460,966 | 7/1984 | Chynoweth et al. | 364/468 |
| 4,472,783 | 9/1984 | Johnstone et al. | 364/468 X |
| 4,473,883 | 9/1984 | Yoshida et al. | 364/468 |

Primary Examiner—Joseph Ruggiero
Attorney, Agent, or Firm—Kurt Kelman

[57] ABSTRACT

In a system for coding a pallet on which a plurality of parts are assembled to form a workpiece in an assembly line, a drive for moving the pallet in a conveying path along the assembly line to successive work stations where the parts are processed or assembled, a plurality of signal carriers on the pallet for generating a signal indicating a defect in the workpiece on the pallet in a respective work station, signal read-out and encoding devices arranged along the conveying path for receiving the generated signals and emitting corresponding control signals, the drive being responsive to the emitted control signals whereby the defective workpiece may be excluded from work in work stations subsequent thereto, the signal carriers being arranged on the pallet in an array in adjacent rows extending in the conveying direction and spaced from each other in this direction, and respective signal carriers in rows spaced from each other in this direction and extending perpendicularly to the adjacent rows for enabling the signals in the perpendicular rows to be sensed simultaneously, one of the adjacent rows providing a respective signal carrier in each perpendicular row, and the signal read-out and encoding device having sensors associated with the signals carriers in the adjacent rows.

21 Claims, 4 Drawing Figures

CODING METHOD AND SYSTEM FOR ASSEMBLY LINE PALLETS

The present invention relates to improvements in a method and system of coding a pallet on which a plurality of parts are assembled to form a workpiece in an assembly line, wherein the pallet is moved in a conveying direction along the assembly line to successive work stations where the parts are processed or assembled and wherein the pattet is encoded to generate a signal indicating a defect in the workpiece on the pallet in a respective one of the work stations for excluding the defective workpiece from work in work stations subsequent thereto. The pallet with the defective workpiece may be conveyed to a discharge station for defective parts or to a station where such parts are processed again to correct their defects.

Various coding systems have been proposed for assembly line pallets. Most of these systems comprise signal carriers, for example pivotal or adjustable pins or bolts and the like, arranged on the pallet. These signal carriers usually merely signal defective work so that the pallet may be indicated as carrying such defective work. This is done by adjustment devices mounted at the work or processing stations for adjusting the signal carriers on the pallets from a "proper work" to a "defect" position whereby each pallet is suitably coded. Sometimes, such coding is also used for indicating different work steps on the workpieces carried by the pallets. However, these known coding systems cannot be used universally since the adjustable signal carriers require constant maintenance, the cost and space requirements are excessive and the processing of the resultant signals causes considerable difficulties, particularly if electronic controls are used.

It is the primary object of this invention to provide such a coding method and system for fully automated assembly lines, wherein the signals from the signal carriers on the pallets not only offer a great variety of characterizing possibilities but can be readily and dependably read and processed by electronic data processors.

It is another object of the invention to enable the conveying path of any pallet in the assembly line to be steadily monitored and to generate specific signals associated with respective parts or workpieces on each pallet.

The above and other objects are accomplished according to one aspect of the present invention in the above-described method by arranging a plurality of carriers of respective ones of said signals on the pallet in adjacent rows extending in the conveying direction, and arraying respective ones of said signal carriers in rows extending perpendicularly to the adjacent rows for enabling the signals in the perpendicular rows to be sensed simultaneously, one of the adjacent rows providing a respective one of the signal carriers in each one of the perpendicular rows.

According to another aspect of this invention, in a system for coding a pallet on which a plurality of parts are assembled to form a workpiece in an assembly line, which comprises means for moving the pallet in a conveying path along the assembly line to successive work stations where the parts are processed or assembled, a plurality of signal carriers on the pallet for generating a signal indicating a defect in the workpiece on the pallet in a respective one of the work stations, signal read-out and encoding means arranged along the conveying path for receiving the generated signals and emitting corresponding control signals, and means controlling the pallet moving means responsive to the emitted control signals whereby the defective workpiece may be excluded from work in work stations subsequent thereto, there is provided a signal carrier device arranged on the pallet and having an array of a plurality of said signal carriers in adjacent rows extending in the conveying direction and spaced from each other in said direction, and respective ones of said signal carriers in rows spaced from each other in said direction and extending perpendicularly to the adjacent rows for enabling the signals in the perpendicular rows to be sensed simultaneously, one of the adjacent rows providing a respective one of the signal carriers in each one of the perpendicular rows, and the signal read-out and encoding means comprising sensing means associated with the signal carriers in the adjacent rows.

With this method and system, a surprisingly large number of pallets may be very simply coded with a great variety of characteristic signals for each pallet while a dependable read-out and processing of the signals is assured while each pallet rapidly passes the read-out and encoding means arranged alongside the conveying path of the pallets. The parallel sensing of a plurality of signal carriers makes it possible to store a variety of informations accurately reproducibly along a relatively short length.

Figure 2:
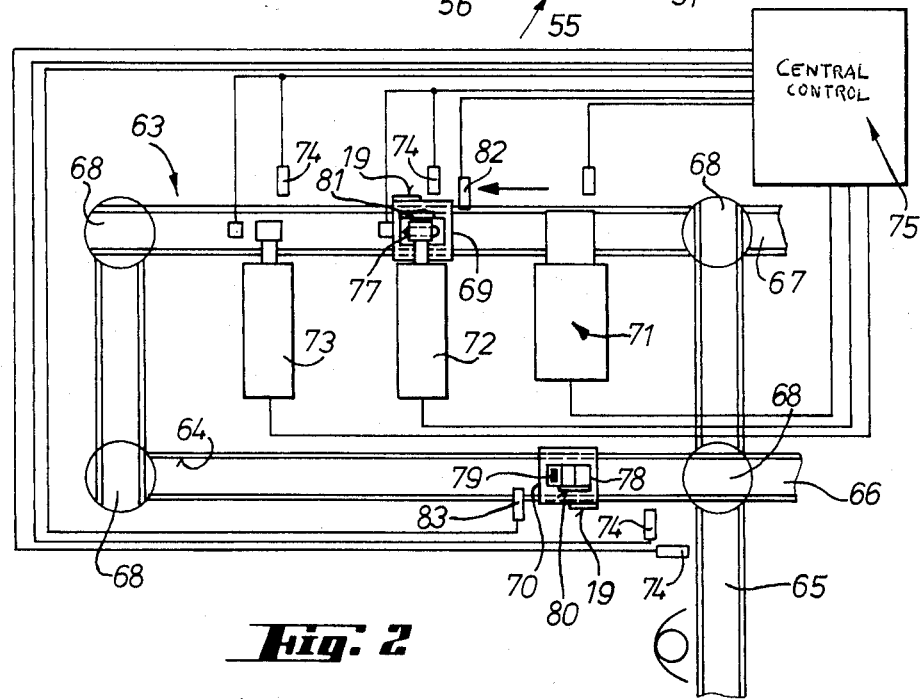
Figure 3:
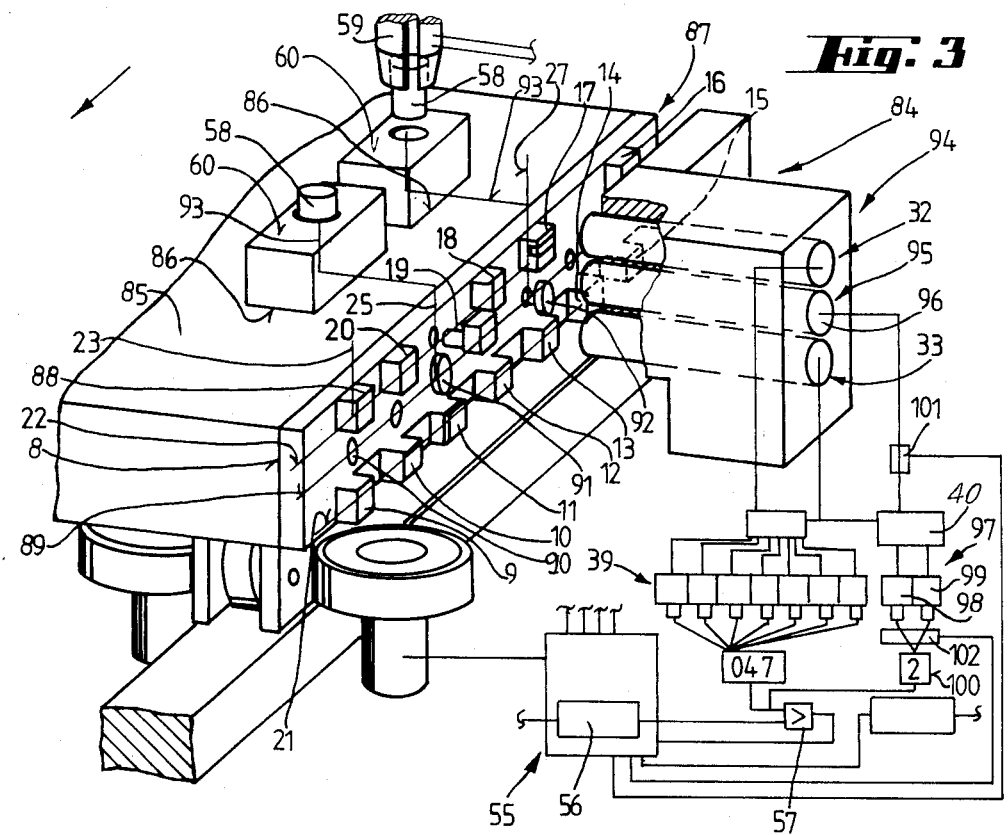
Figure 4:
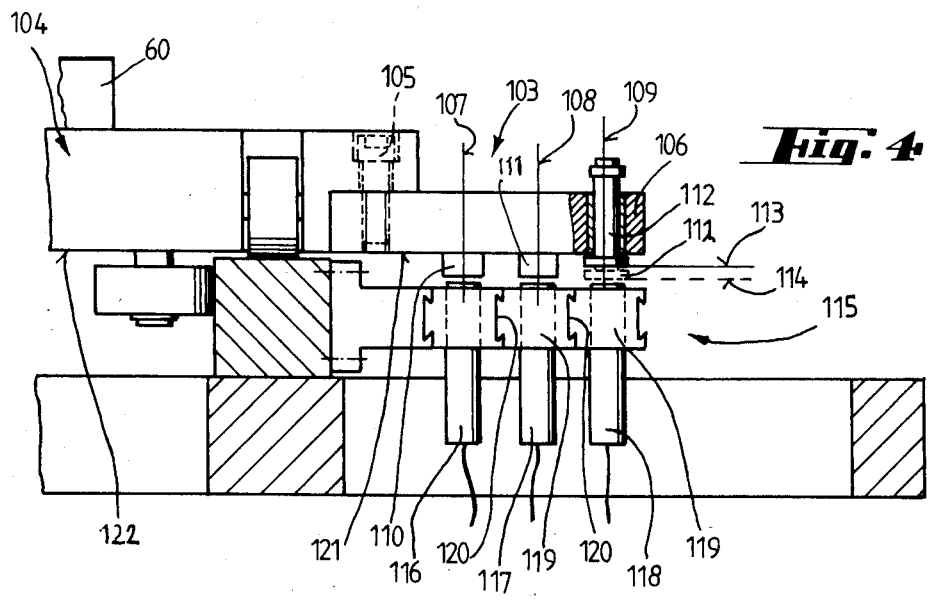

The above and other objects, advantages and features of the invention will become more apparent from the following detailed description of certain now preferred embodiments thereof, taken in conjunction with the generally schematic drawing wherein FIG. 1 is a simplified perspective view showing one embodiment of the coding system for characterizing or coding a pallet moving along an assembly line in a conveying direction, including the associated controls, FIG. 2 shows a top view of an assembly line incorporating the coding system for respective pallets moving along the line, FIG. 3 is a view similar to that of FIG. 1 and illustrating another embodiment, and FIG. 4 is an end view of a pallet in the assembly line, partly in section, showing still another embodiment.

Referring now to the drawing and first to FIG. 1, the coding method and installation of the present invention is illustrated in connection with pallet 4 on which a plurality of parts 58, 60 are assembled by manipulating device 59 to form a workpiece at work or processing station 30 in assembly line 1. The pallet is moved along assembly line conveying path 2 in conveying direction 3 to successive work stations where the parts are processed or assembled. Pallet 4 is vertically guided in the conveying path by guide rollers 5 running on guide ledges 6 while the the pallet is laterally guided in the conveying path by pairs of rollers 7, 7 rotatable about a vertical axis, one of the rollers of each pair being driven to constitute means for moving the pallet in the conveying path. Preferably, the driven roller is coupled to a drive motor through a slip clutch. Rollers 7, 7 frictionally engage sides 8 of pallet 4 and the resultant friction force causes the pallet to be entrained by the driven roller.

Pallet 4 is encoded to generate a signal indicating a defect in the workpiece on the pallet in a respective work station for excluding the defective workpiece from work in work stations subsequent thereto. For this purpose, a signal carrier device is arranged on pallet 4, which has an array of a plurality of signal carriers 9 to 20 in adjacent rows 21, 22 extending in conveying direction 3, the signal carriers being spaced from each other in this direction, and respective signal carriers in rows 23 to 29 spaced from each other in this direction and extending perpendicularly to adjacent rows 21, 22 for enabling the signals in the perpendicular rows to be sensed simultaneously. Row 21 provides a respective signal carrier 9 to 15 in each perpendicular row while while signal carriers 9 and 16 to 20 are positioned in row 22. Perpendicular sensing rows 23 to 29 are constituted, respectively, by signal carrier 9 and signal carriers 10, 20; 11, 19; 12, 18; 13, 17; 14; 15, 16. In the illustrated embodiment, the signal carrier device comprises support plate 8' for the signal carriers, which is mounted on vertical side 8 of pallet 4.

Signal read-out and encoding means 31 is arranged at work station 30 along conveying path 2 and faces vertical pallet side 8 for receiving the generated signals from the signal carriers in the perpendicular rows and emitting corresponding control signals. This comprises sensing means 32, 33 associated with the signal carriers in perpendicular rows, this sensing means being constituted by sensors 34, 35 vertically spaced from each other in registry with adjacent rows 21, 22 of the signal carriers. In this manner, the sensors will sense the presence of signal carriers in row 22 as well as the signal carriers in adjacent row 21.

The illustrated signal carriers are metal faces 36 mounted on, and projecting from, support plate 8' towards read-out and encoding means 31, and sensors 34, 35 are electromagnetic proximity fuses, also known as pulsors, associated with adjacent rows 21, 22 of signal carriers for sensing the metal plates. This arrangement has the advantage that standard sensors may be used, which are effective without problem in areas clogged with dirt, as they occur in assembly lines. Sensor 35 is arranged in registry with row 21 while sensor 34 is in registry with row 22 of the signal carriers.

A characteristic number in the binary digital code is associated with each signal carrier in adjacent rows 21, 22 and the sensed signals of all signal carriers in row 21 as well as the sensed signals from any additional signal carriers in adjacent row 22 are transmitted to slide register 39 for step-by-step operation thereof. A signal corresponding to the binary sum totaled in slide register 39 is transmitted to counter 49 after the signals of last perpendicular row 29 have been sensed, and the signal is then transmitted from the counter to memory 56 where the transmitted characteristic signal is stored. As pallet 4 is conveyed in work station 30 into a position wherein the signal carrier device faces the read-out and encoding means, metal faces 36 of any signal carriers present in rows 21, 22 will sequentially operate proximity fuses 34, 35 to generate signals at output 37 of fuse 35 and, where signal carriers are present in row 22, at ouput 38 of fuse 34. Outputs 37 and 38 are connected to drive 40 operating slide register 39 to transmit the output signals to the slide register drive. Since signal carriers 9 to 15 are equidistantly spaced along row 21 in perpendicular rows 23 to 29, a timing pulse is transmitted to slide register drive 40 from output 37 of sensor 35 at a regular interval. The timing pulse causes output 38 of sensor 34 to be connected selectively with a respective one of seven sequentially arranged individual registers 41 to 47 of slide register 39 which store the number of signal carriers sensed in perpendicular rows 23 to 29 and generate corresponding output signals. After all the perpendicular rows have been sensed as pallet 4 passes in conveying direction 3, individual registers 42, 43, 44, 44, 45 and 47 will have stored therein signals from the signal carriers arranged along row 22 in perpendicular rows 23 to 27 and 29, individual register 46 receiving no signal since there is no signal carrier along row 22 in perpendicular row 28. Multiplication member 48 is arranged to receive the output signals from the individual registers and counter 49 is connected to the multiplication member for indicating a characteristic signal of the carrier, which is the binary sum totaled in the counter. In the illustrated embodiment, the signal carrier sequence in row 22 of the signal carrier device produces binary code number "47", it being assumed that signal carrier 19 is also coupled to support plate 8' by means 50 for detachably coupling the signal carriers to the support plate. For a better understanding, signal carrier 19 is shown in an exploded view detached from the support plate to indicate that the signal carriers are replaceably mounted and selected signal carriers may be plugged into the support plate. In this manner, characteristic signal 51 at the counter, which is constituted by the binary sum of the number of signal carriers on the support plate, may be changed at will.

As shown in FIG. 1, signal carrier 9 extends in leading perpendicular row 23 in conveying direction 3 over both adjacent rows 21, 22 and the perpendicular rows of the signal carriers are equidistantly spaced in the conveying direction. Since the leading perpendicular row of signal carriers has a signal carrier in each adjacent row 21, 22, the exact beginning of the entire sensing process will be effectively determined and faulty signal transmissions will be avoided. Signal carriers are provided only in some of the perpendicular rows along row 22 and the array of signal carriers on support plate 8' is sensed to produce signal 51 characteristic of pallet 4. After the work has been properly completed at work station 30, the characteristic signal is transmitted to a subsequent work station. In this manner, each pallet is characterized by its own code and may be followed along the entire assembly line for proper monitoring, the codes indicating desired information about the state of the workpiece on the pallet, the course of the assembly procedure, tolerances, test results, etc. Only those pallets conveyed in the conveying direction whose characteristic signal corresponds to the stored characteristic signal may then be stopped, held in fixed position and worked on at a subsequent station to which the characteristic signal has been transmitted. If the signal carriers are associated with a binary code, a relatively small number of signal carriers can produce a large number of different characteristic pallet signals. Also, this enables the read-out and encoding means to be relatively simply structured and to process the generated information simply and very fast. With the equidistant spacing of the signal carriers in the conveying direction, variations in the conveyor speed will not unfavorably influence the result of the sensing of the signal carriers. The specific arrangement of the read-out and encoding means assures a timed reception of the information from the signal carrier device and enables the information to be processed in a great variety of ways by means of known circuits, including slide registers, microprocessors and the like.

As has been indicated in FIG. 1 in connection with signal carrier 17, the signal carriers may have memories 52 storing a respective code. The memories are magnetic tracks 53 and read-out and coding means 31 comprises encoding or decoding member 54 for coding or reading the magnetic track. This has the advantage that, when pallets are replaced, the code of the pallet may be simply changed by renumbering to adapt the pallet to the coding system. The memory on the signal carrier may include not only the characteristic signal of the pallet but also additional desired information e.g. of defective work at the work station.

Means 55 controlling pallet moving means 7 is arranged at work station 30 and comprises memory 56 storing the characteristic signal of pallet 4 received from counter 49 of a preceding work station where work on the pallet has been properly completed. As shown the output of counter 49 is connected to comparator 57 and the comparator has one output connected to memory 56 while another output thereof is connected to pallet moving controlling means 55. Signal 51 obtained from the signal carrier device on pallet 4 at work station 30 is compared in comparator 57 with the signal stored in memory 57 to ascertain whether it is the same as the stored signal, or not. If it is the same, the pallet is stopped in work station 30, held in a fixed position and worked on by operating manipulating device 59 to assemble part 58 on workpiece 60. For this purpose, control 55 has signal inputs and outputs 61 for controlling and monitoring means for stopping and holding pallet 4 in a fixed position and for working thereon. After the work has been properly completed, characteristic signal 51 is transmitted by control 55 to memory 62 of a subsequent similarly equipped work station where it is stored and used in the same manner as hereinabove described in connection with memory 56. With this arrangement, it is possible to exclude carriers with defective workpieces from work in a subsequent work station without providing special "defect" codes and changing characteristic signal 51 because the pallet moving means is responsive to control 55. If the signal stored in memory 56 does not match signal 51, pallet 4 will not be stopped in the work station so that any defective workpiece thereon will be excluded from work and the pallet will be moved on, for example to a repair station or to a storage station for defective parts.

FIG. 2 illustrates assembly line 63 with endless rectangular conveying path 64 to which branch conveying paths 65 to 67 are connected by switch stations 68. The switch stations are also used to enable pallets 69, 70 to be deflected at the corners of rectangular conveying path 64. While any number of pallets may be used in the assembly line, only two have been illustrated for the sake of clarity. A sequence of work or processing stations 71, 72 and 73 are arranged along conveying path 64, the number and type of stations being chosen according to requirements. Various processing and/or manipulating machinery is located at the work or processing stations, as may be required. To enable the pallets to be monitored along the entire conveying path of the assembly line, each pallet is equipped with a signal carrier device of the above-indicated type, the signal carriers being designated 19 in FIG. 2. The read-out and encoding means at work stations 71, 72, 73 along the conveying path are designated 74. All the read-out and encoding means are connected to central control 75 to enable the entire operation to be monitored at the same time.

As schematically shown in the drawing, pallets 69, 70 are multi-part structures. Assembly support plate 76 for workpiece 77 is preferably replaceably mounted on pallet 69 while part carrier 78 for parts 79 is preferably replaceably mounted on pallet 70. To enable a complete monitoring of all the pallet parts which carry respective workpieces 77 and assembly parts 79, each assembly part 76, 78 has its own signal carrier device 80, 81 sensed by read-out and encoding means 82, 83 vertically staggered from read-out and encoding means 74 to make a proper sensing of the pallets and their parts possible.

It is preferred to position signal carrier devices 80, 81 on assembly support plate 76 and parts carrier 78, respectively, in the same manner as the signal carrier devices on pallets 69, 70 so that all signal carriers may be sensed by read-out and encoding means 74. To differentiate between the pallet, the assembly support plate and the parts carrier, the signal carriers in leading perpendicular row 23 in conveying direction 3 (FIG. 1) may be differently arranged on the pallet, the assembly support plate and the parts carrier. With this arrangement, it is possible to convey those pallets sharing the same codes indicating like arrangements of assembly support plates and parts carriers to designated areas of the assembly line, for example for receiving additional parts, further processing, storing and the like, and to record the location of each pallet and its assembly support plate and parts carrier.

FIG. 3 illustrates a different embodiment of system 84 for coding pallet 85. The pallet is equipped with a plurality of parts holders 86 for arranging parts 58, 60 sequentially on pallet 85 in the conveying direction. Except as hereinbelow described, the pallet, the conveying path in the assembly line, the pallet moving means and the coding system controlling the moving means is essentially the same as that of FIG. 1, like reference numerals designating like parts operating in a like manner so that a repetition of the description is not required. Signal carrier device support plate 87 is mounted on vertical side face 8 of pallet 85, signal carriers 9 to 15 being arranged in row 21 extending in the conveying direction while signal carriers 88 and 16 to 20 are arranged in adjacent row 22 extending parallel to row 21. A third row 89 containing signal carriers 90 to 92 extends between rows 21 and 22 parallel thereto. Leading perpendicular row 23 contains signal carriers 88, 90, 9 and the other signal carriers are arrayed in sequential perpendicular rows 24 to 29, as fully described in connection with FIG. 1. As in the embodiment of FIG. 1, the arrangement of a signal carrier support plate at a vertical side of the pallet has the advantages of enabling the signal carriers to be readily sensed while reducing the deposition of dirt on the signal carriers and enabling the signal carrier device to be cleaned easily if it becomes dirty.

Deviating from that embodiment, signal carriers 91 and 92 of row 89 are detachably coupled to support plate 87 in perpendicular rows 25 and 27 between signal carriers 11 and 19 and signal carriers 13 and 17. As indicated by lines 93, signal carriers 91, 92 are arranged in row 89 to be associated or aligned in registry with a respective one of parts carriers 86 for workpieces 60. These signal carriers are sensed simultaneously with the signal carriers in row 21 for signaling the parts or workpieces in carriers 86. In this way, the position of the workpiece parts on the pallet is coded simultaneously with the pallet itself. When, as shown in FIG. 3, rear workpiece 60 in the conveying direction is in its working position ready for assembly, as indicated by aligned manipulating device 59, signal carrier 92 in registry therewith is in the range of read-out and encoding means 94. This read-out and encoding means differs from that of FIG. 1 by the provision of a third sensor 95 consisting of proximity fuse 96 to sense the signal carriers in row 89. Obviously, other types of signal sensors may be used, such as infrared radiation sensors, optical eyes, Hall generators and the like. As in FIG. 1, the number of signal carriers in rows 20 and 21 is sensed by proximity fuses 34 and 35 to produce output signals transmitted to slide register 39. Read-out and encoding means 94 comprises a further slide register 97 whose drive 40 also receives the timing pulse from sensor 33. In the same manner as described in connection with slide register 39, the output of sensor 95 is connected to a selected one of individual registers 98, 99 in response to the respective timing pulses. Further counter 100 is connected to the outputs of individual registers 98, 99 and will accordingly show the respective positions of the workpieces on the pallet, as indicated by signal carriers 91, 92 in registry therewith. At the same time, the output signal from sensor 95 may be transmitted by switching device 101 to control 55 to stop the pallet and hold it in a fixed position while operating manipulating device 59 for assembling a part 58 with rear workpiece 60. After the characteristic signal of the pallet has been read, it is compared in comparator 57 with the signal stored in memory 56, as in the embodiment of FIG. 1. In addition, however, the output signals of register 97 are also transmitted to comparator 57 so that control 55 will receive the additional information whether both sequentially arranged workpieces 60 on pallet 85 have passed the work station.

To enable defective work or an incomplete assembly to be signaled, monitoring device 102 may be connected between the outputs of individual registers 98, 99 so that their output signals will be transmitted to comparator 57 only if control 55 indicates the signal characteristic of the proper completion of the work. In this way, control 55 will transmit to memory 62 of a subsequent work station only such pallet code signals with respective workpiece position code numbers as are associated with pallets on which the work at the preceding work station has been properly completed, thus avoiding the further processing of defective workpieces. This will eliminate the costs connected with doing work on defective workpieces.

FIG. 4 illustrates coding system 103 for pallet 104, wherein signal carrier device support plate 106 is mounted on pallet 104 by detachable fastening elements, such as bolts 105. Signal carriers 110 to 112 are arranged on the support plate in three adjacent rows 107 to 109 extending in the conveying direction and respective ones of the signal carriers are arrayed in sequentially spaced perpendicular rows in the manner explained in detail in connection with FIGS. 1 and 3. Signal carrier 112 is a pin vertically adjustable in a guide bore defined in support plate 106 between an operative switching position 114 shown in broken lines and an inoperative switching position 113 shown in full lines, with respect to read-out and encoding means 115 which has sensors 116 to 118 associated with rows 107 to 109 of signal carriers 110 to 112, the general structure and function of the sensors and read-out and encoding means 115 being of the same type as described hereinabove.

As shown in the drawing, holders 119 for sensors 116 to 118 are plugged together so that, depending on requirements, additional sensors may readily be added.

While signal carriers 110 and 111 in adjacent rows 107 and 108 operate in a manner similar to the signal carriers in rows 21 and 22 of the embodiments of FIGS. 1 and 3 to signal the characteristic number of the pallet, signal carrier 112 is used to indicate for one or several workpieces on pallet 104 a "defect" in one of the switching positions, preferably operative position 114, and a "proper work" position in the other switching position. A cylinder-piston coding device adjusts signal carrier pin 112 between active position 114 closer to read-out and encoding means 115 and inactive position 113 more remote therefrom. When the signal carrier pin is in remote position 113, it will not activate sensor 118 in registry therewith, which indicates that the work has been properly completed. When it is moved closer to the sensor, it will be activated to produce an output signal indicating defective work. This arrangement enables the coding system to be used not only for coding the pallet but also provides a mechanical sensing of defective work at the work station without transmitting the latter code to the next station. This combines the electronic processing of the characterizing pallet code signal with a mechanical defective/proper work signal at each work station. If the adjustable signal carrier is adjusted into the "defect" code switching position in each work station, a pallet at this station can only be coded as carrying defective work if the adjusted signal carrier generates a corresponding output signal but, conversely, it is not possible to signal a pallet carrying such defective work as carrying properly completed work. Signal carrier pin 112 adjusted into operative position 114 indicates that the workpiece associated with this signal carrier pin is defective. One adjustable signal carrier may be arranged in registry with each part or workpiece on the pallet. In this way, it is possible to omit the transmission of "defect" code signals to subsequent stations.

As shown in FIG. 4, pallet 104 has an upper side supporting workpiece or workpieces 60 and underside 122 parallel thereto. The signal carrier devices comprises support plate 106 extending in a plane parallel to pallet underside 122 and signal carriers 110 to 112 are arranged on side 121 of the support plate facing away from the upper side of the pallet. This arrangement will prevent clogging the signal carriers with dirt, such as lubricants, dust, metal chips or the like, or damaging them by falling workpiece parts so that false signals will be obviated.

Any number of rows may be used in the signal carrier array and, if desired, adjustable signal carrier or carriers may be arranged in a separate adjacent row extending in the conveying direction so that the signal indicating defective or proper work is given at each work station and need not be transmitted from control 55 to the subsequent station.

It is advantageous if a mechanically fixed element is associated with sensor 118 for adjusting signal carrier pin 112 into operative switching position 114 before work begins. If a coding device for adjusting the signal carrier is arranged at the work station in the range of the stopping position of the pallet during the work, it can adjust the signal carrier into inoperative switching position 113 after the work has been properly completed. In this way, if the control fails, at worst every pallet will be coded "defective" even if the work has been properly completed at the station. But no defective pallet can be coded as "proper" for further work.

Within the spirit and scope of the present invention, it is possible to use any suitable signal carrier device of any suitable material. The signal carrier device support plate as well as the signal carriers may be made of synthetic resin, for example, and metal signal plates, permanent magnets or other signaling means may be incorporated therein, preferably in a foaming or injection molding process, the signaling means being designed for sensing by the sensors of the read-out and encoding means. It is also possible to prepare the signal carriers by mechanically working a support plate or producing the plate carrying the signal carriers in a foaming or injection molding process and activating the signal carriers by bonding metal faces thereto. The electronic read-out and encoding means also may take any suitable form reflecting the state of the art. The sensors may be electromagnetic proximity fuses, optical eyes, laser or opto-electrical sensing elements, as well as infrared radiation responsive devices. Also, the signal carrier device may be arranged at any desired location on the pallets, parts carriers and assembly support plates as long as they are so positioned that they may be sensed by the associated read-out and encoding means. It will be useful if the signal carrier devices are replaceably mounted.

What is claimed is:

1. A method of coding a pallet on which a plurality of parts are assembled to form a workpiece in a assembly line, wherein the pallet is moved in a conveying direction along the assembly line to successive work stations where the parts are processed or assembled and wherein the pallet is encoded to generate respective signals indicating respective defects in the workpiece on the pallet in a respective one of the work stations for excluding the defective workpiece from work in work stations subsequent thereto, wherein the improvement comprises the steps of
(a) arranging a plurality of carriers of respective ones of said signals on the pallet in adjacent rows extending in the conveying direction, and
(b) arraying respective ones of said signal carriers in rows extending perpendicularly to the adjacent rows for enabling the signals in the perpendicular rows to be sensed simultaneously,
  (1) one of the adjacent rows providing a respective one of the signal carriers in each one of the perpendicular rows.

2. The coding method of claim 1, comprising the further steps of providing respective ones of the signal carriers in a respective one of the adjacent rows other than said one row in only some of the perpendicular rows, the signal carriers on the pallet constituting an array of signal carriers, sensing the array and producing a signal characteristic of the pallet from the sensed array of signal carriers at a respective one of the work stations where the work has been properly completed, and transmitting the characteristic signal to a subsequent one of the work stations after the work has been properly completed.

3. The coding method of claim 2, comprising the further steps of storing the transmitted characteristic signal in a memory, and stopping, holding in fixed position and working on, at the work station, only those of the pallets conveyed in the conveying direction whose characteristic signal corresponds to the stored characteristic signal.

4. The coding method of claim 3, comprising the further steps of associating characteristic numbers in the binary digital code with the signal carriers in the adjacent rows, transmitting the sensed signals of all signal carriers in the one adjacent row to a slide register for step-by-step operation thereof, the presence of additional ones of the signal carriers in any adjacent row other than said one row being indicated therein, transmitting a signal corresponding to the binary sum to a counter after the signals of a last one of the perpendicular rows have been sensed, and transmitting the signal from the counter to the memory.

5. The coding method of claim 1, wherein a plurality of said parts are arranged on the pallet sequentially in the conveying direction, comprising the further steps of arranging respective ones of the signal carriers respectively associated with a respective one of the sequentially arranged parts in a respective one of the adjacent rows other than said one row, and said latter signal carriers are sensed simultaneously with the signal carriers in the one row for signaling the respective parts.

6. The coding method of claim 1, comprising the further steps of associating a signal sensing means with the perpendicular rows of signal carriers, the signal sensing means having respective outputs associated with the signal carriers in the perpendicular rows, and generating an output signal at said outputs when a leading one of the perpendicular rows of signal carriers in the conveying direction passes the signal sensing means.

7. The coding method of claim 1, wherein one of the signal carriers in one of the perpendicular rows is adjustable between an operative and inoperative switching position with respect to the other signal carriers in said row, one of the switching positions indicating a "defect" code and the other switching position indicating a "proper work" code, comprising the further steps of associating a read-out means with the adjustable signal carrier for reading the switching position of the adjustable signal carrier when it passes the read-out means, and adjusting the switching position of the adjustable signal carrier in response to the respective code.

8. A system for coding a pallet on which a plurality of parts are assembled to form a workpiece in an assembly line, which comprises means for moving the pallet in a conveying path along the assembly line to successive work stations where the parts are processed or assembled, a plurality of signal carriers on the pallet for generating a signal indicating a defect in the workpiece on the pallet in a respective one of the work stations, signal read-out and encoding means arranged along the conveying path for receiving the generated signals and emitting corresponding control signals, and means controlling the pallet moving means responsive to the emitted control signals whereby the defective workpiece may be excluded from work in work stations subsequent thereto, wherein the improvement comprises
(a) a signal carrier device arranged on the pallet and having an array of
  (1) a plurality of said signal carriers in adjacent rows extending in the conveying direction, the signal carriers being spaced from each other in said direction, and
  (2) respective ones of said signal carriers in rows spaced from each other in said direction and extending perpendicularly to the adjacent rows for enabling the signals in the perpendicular rows to be sensed simultaneously, one of the adjacent rows providing a respective one of the signal carriers in each one of the perpendicular rows, and (b) the signal read-out and encoding means being arranged at respective ones of the work stations and comprising sensing means associated with the signal carriers in the perpendicular rows.

9. The coding system of claim 8, wherein a respective one of the signal carriers is arranged in each one of the adjacent rows in a leading one of the perpendicular rows in the conveying direction.

10. The coding system of claim 8, wherein the perpendicular rows of signal carriers are equidistantly spaced in the conveying direction.

11. The coding system of claim 8, wherein the read-out and encoding means further comprises a slide register, a drive operating the slide register, a respective one of the sensing means associated with the one adjacent row of signal carriers generating an output signal responsive to the signal of the sensed signal carrier and the output signal operating the slide register drive, the slide register including individual registers storing the number of signal carriers sensed in the perpendicular rows and generating corresponding output signals, a multiplication member arranged to receive the output signals from the registers; and a counter connected to the multiplication member for indicating a characteristic signal of the carrier.

12. The coding system of claim 8, wherein the signal carrier device comprises a support plate and means for detachably coupling the signal carriers to the support plate.

13. The coding system of claim 12, wherein the signal carriers have memories storing a respective code and the read-out and encoding means comprises a coding member associated with the memories for encoding or decoding the same.

14. The coding system of claim 13, wherein the memories are magnetic tracks.

15. The coding system of claim 12, wherein respective ones of the parts are arranged on the pallet sequentially in the conveying direction and the signal carriers in the one adjacent row are detachably coupled to the support plate in registry with the sequentially arranged parts.

16. The coding system of claim 8, wherein the signal carrier device comprises a support plate and the signal carriers are metal faces mounted on, and projecting from, the support plate towards the read-out and encoding means, and the read-out and encoding means comprises electromagnetic proximity fuses associated with the rows of signal carriers for sensing the metal plates.

17. The coding system of claim 8, wherein the pallet has a vertical side facing the read-out and encoding means and the signal carrier device is arranged on the vertical pallet side.

18. The coding system of claim 8, wherein the pallet has an upper side supporting the workpiece and an underside parallel thereto, and the signal carrier device comprises a support plate for the signal carriers, the support plate extending in a plane parallel to the underside of the pallet and the signal carriers are arranged on a side of the plate facing away from the upper side of the pallet.

19. The coding system of claim 8, wherein one of the signal carriers in one of the perpendicular rows is adjustable between an operative and inoperative switching position with respect to the read-out and encoding means, one of the switching positions indicating a "defect" code and the other switching position indicating a "proper work" code, and further comprising a cylinder-piston coding device for adjusting the one signal carrier between the active switching position closer to the read-out and encoding means and the inactive position more remote therefrom, the active switching position indicating the "defect" code.

20. The coding system of claim 19, wherein one of said adjustable signal carriers is arranged in a respective one of the perpendicular rows in registry with a respective one of the parts or workpieces on the pallet.

21. The coding system of claim 8, further comprising at least one holder for workpiece parts on the pallet, a like one of said signal carrier devices arranged on each holder, and the sensing means comprising sensors associated with the signal carriers of the like signal carrier device.

* * * * *